US006883002B2

(12) United States Patent
Faudman

(10) Patent No.: US 6,883,002 B2
(45) Date of Patent: Apr. 19, 2005

(54) REAL ESTATE INFORMATION EXCHANGE PROCESS AND SYSTEM

(76) Inventor: David Allen Faudman, 23 Highland Ct., Larkspur, CA (US) 94939

( * ) Notice: Subject to any disclaimer, the term of this patent is extended or adjusted under 35 U.S.C. 154(b) by 312 days.

(21) Appl. No.: 09/817,946

(22) Filed: Mar. 26, 2001

(65) Prior Publication Data

US 2002/0138485 A1 Sep. 26, 2002

(51) Int. Cl.[7] ............................................. G06F 17/30
(52) U.S. Cl. ............................. 707/10; 707/9; 707/104; 707/3; 705/8; 705/10; 705/14; 705/27
(58) Field of Search ............................. 707/10, 104, 3, 707/9; 705/1, 10, 8, 27, 14, 26

(56) References Cited

U.S. PATENT DOCUMENTS

| | | | |
|---|---|---|---|
| 6,236,977 B1 * | 5/2001 | Verba et al. ................... 705/10 |
| 6,321,202 B1 * | 11/2001 | Raveis, Jr. ...................... 705/1 |
| 6,484,176 B1 * | 11/2002 | Sealand et al. ................ 707/10 |
| 6,519,618 B1 * | 2/2003 | Snyder ..................... 707/104.4 |
| 6,594,633 B1 * | 7/2003 | Broerman ....................... 705/1 |
| 6,684,196 B1 * | 1/2004 | Mini et al. ..................... 705/26 |
| 2002/0035520 A1 * | 3/2002 | Weiss .......................... 705/27 |
| 2002/0046077 A1 * | 4/2002 | Mozayeny et al. ............ 705/8 |
| 2002/0077893 A1 * | 6/2002 | Wolf et al. .................... 705/14 |
| 2004/0143450 A1 * | 7/2004 | Vidali ........................... 705/1 |

OTHER PUBLICATIONS

Whatley et al., "Method and system for providing real estate services using global network", US Patent Application Publication, May 2002, pp. 1–16.*
Olefson, "Method and apparatus for selection and viewing real estate properties", US Application Publication, May 2003, pp. 1–13.*

* cited by examiner

Primary Examiner—Thuy N. Pardo
(74) Attorney, Agent, or Firm—Risto A. Rinne, Jr.

(57) ABSTRACT

A system and process includes a computer that is operatively connected to the Internet. A database of MLS properties that are for sale is maintained that is accessible to the computer. Real estate agents must subscribe in order to use the system and are then included in the database. Clients may be either prospective buyers or sellers of the MLS properties. Each client is required to complete a client commitment form whereby the client elects to have a currently subscribing real estate agent represent them before they are allowed access to the information and services provided. Real estate agents may view any of the client's files and activities and post upcoming MLS properties that are to be offered for sale and to FAX property defects to other real estate agents. Agents are also able to view the activity of any of their own listings.

32 Claims, 16 Drawing Sheets

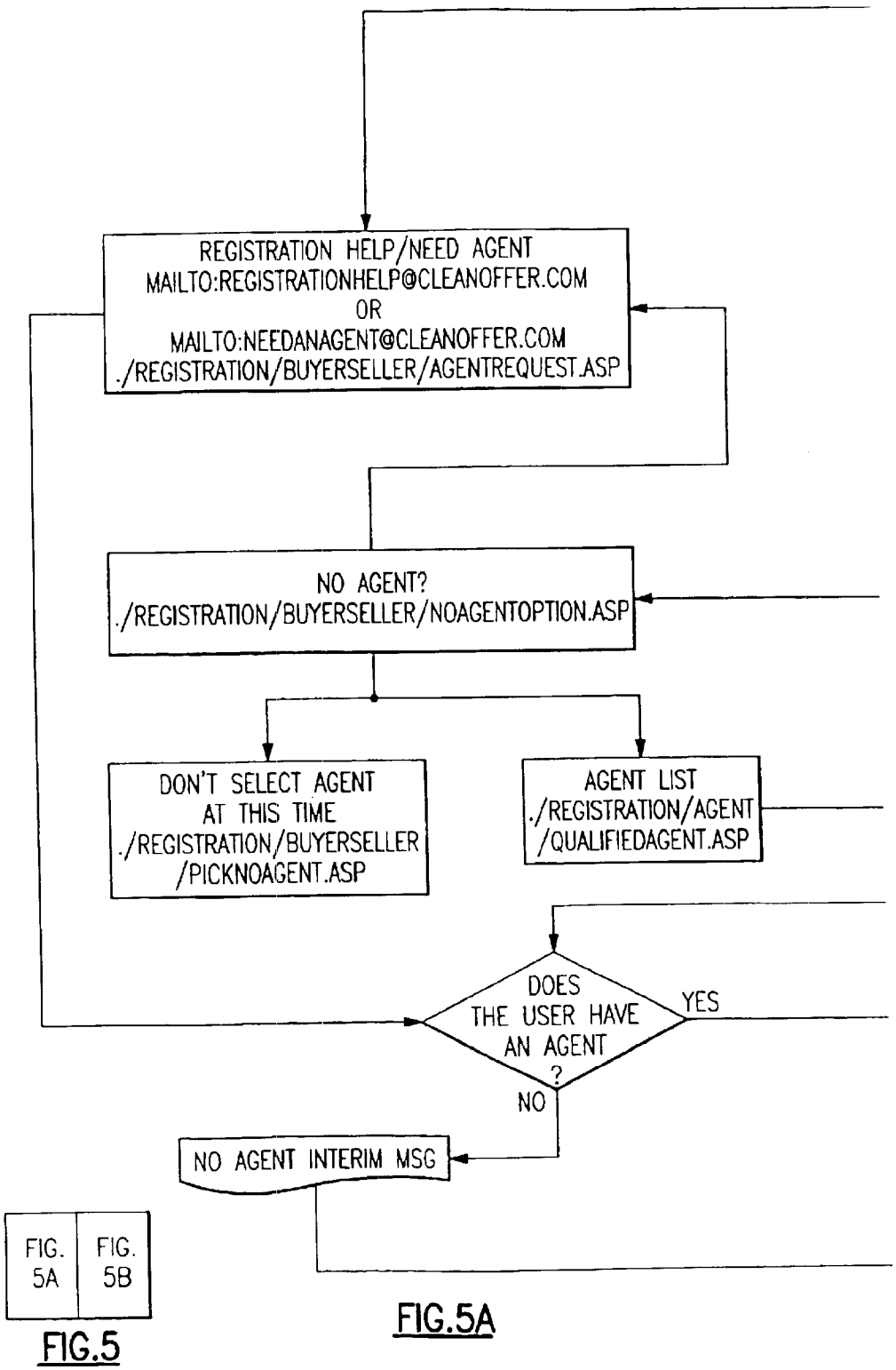

REAL ESTATE INFORMATION EXCHANGE PROCESS AND SYSTEM

BACKGROUND OF THE INVENTION

1. Field of the Invention

The present invention, in general relates to methods and systems for the exchange of specific information from one real estate agent to another and from an agent to a client and, more particularly, to methods and systems that provide this information over the Internet.

Currently, some real estate agents and brokers spend a great deal of time and money in maintaining a presence on the Internet of the type that allows for the exchange of information from agent to client. Having such capabilities, the agent may be able to send to the client a limited amount of information concerning select properties offered for sale through the Multiple Listing Service (hereinafter "MLS").

However, these "agent-run" types of systems are limited in that they do not provide any mechanism that can make available for other agents in a given area any information concerning new properties (not yet appearing on the MLS). Agents would like to immediately know as much about such upcoming MLS properties as possible and then to be able to provide their selected clients with that information so that these selected clients can respond (i.e., make an offer to purchase or preview the property, for example) in a much more timely manner than is possible at present.

There are also a great many needs for both real estate agents and clients that are not presently being satisfied. This is partly due to the tendency that agents may have to keep certain information secret for as long as possible. For example, agents may refrain from disseminating information concerning upcoming MLS properties. There is insufficient incentive, at present, for them to do so.

The term "clients" as used herein, refers to those people (or business entities) who wish either to buy or to sell real property. Buyers and sellers each have their own unique needs and no existing real estate system well serves the combined needs of buyers, sellers, and agents.

Ideally, if such a system were available, agents would be spared from investing an excess of time, energy, and financial resources into building and maintaining what is a modest Internet presence, at best. Instead, they would be better able to focus their energies on that which they do best, the listing and selling of homes.

Agents would be able to subscribe to such a service, if it were available. The service, in turn, would then provide an effective tool for both the agent and their clients to use.

While MLS property information is important to make available to clients, it is also desirable to restrict its access from the general public. MLS information is either proprietary or confidential in nature. Sellers would certainly resist listing their property in an MLS type of an environment if they knew that this information would be distributed freely to the general population.

There are many information fields involving the selling of a home that should remain proprietary or confidential. Sellers, for example, would not want to be approached by idle curiosity seekers or from the almost innumerable vendors who would approach them if this information were available to the public, at large. Moving companies, charitable organizations, and other businesses would approach them in the hope of soliciting business.

Perhaps some people having unethical motives would even use MLS information to their wrongful advantage. A burglar, for example, could possibly learn which homes were vacant and for what periods of time.

Clearly, certain types of MLS information must not be released to unauthorized persons. In general, all types of MLS information should not be released except to selected persons who first qualify to receive that information.

No such automated type of a system presently exists for first qualifying a client and then providing a qualified client with access to selected MLS information fields.

The necessary criteria for qualifying a client to receive MLS information is satisfied by first establishing a relationship between a real estate agent and the client. In typical face-to-face or extensive phone conversational types of real estate encounters, establishing this type of a relationship is considered to the be the minimum criteria for receiving such types of privileged MLS access. The establishment of a committed type of a relationship is, therefore, required to occur first before access to such an automated type of a system, having access to select MLS data, is made available to the client.

As such, a screening process will have occurred whereby the selected MLS data is provided only to those people who are earnest enough to first establish a client relationship with an agent (or broker). As such, these types of people may truly be referred to, after having first established such a relationship, as "clients". The act of first establishing a committed relationship with a particular agent well demonstrates their intention to be a client of one form or another.

As mentioned hereinabove, it is further necessary to restrict the viewing of certain fields of information from the general public. For example, a prospective buyer may not be permitted to view certain MLS fields of information that are considered proprietary and which are shared by the seller with the real estate agent. If it is later appropriate for the agent to provide a prospective buyer with this information, the agent may then personally do so after first having obtained the approval of the seller, either directly or inferentially.

An agent's time is also quite limited. There are also numerous related questions that an agent must answer and services that an agent must provide in order to satisfy both buyers and sellers. These factors intrude upon the agent's available time for important face to face contacts with his or her clients. It is desirable to automate the availability of this type of information so as to lessen the burden on the agent while making this information available in an especially timely manner to their clients.

Such a feature that would lessen the burden of an agent would, in turn, encourage agents to use (i.e., subscribe to) such a system. The more agents that use such as system would, of necessity, share information with the system and this would, in turn, make the system more informative to other agents. Accordingly, the value of such a system would increase in proportion to the number of agents who use it. Therefore, it is important that the system be of value to agents in the performance of their duties.

A number of other real estate needs exist as well. For example, it would be advantageous if agents and clients were able to view, on a geographical basis, a graph that showed the percentage of homes in escrow as compared with the number that are generally available for sale. Such a graph would indicate the type of market for a particular area, namely if it was a buyer's or a seller's market and it would be useful in both pricing properties and in helping to make a decision whether to purchase a property at a particular price or, conversely, whether or not to sell it at a particular price in view of these current market conditions.

Furthermore, review of changes occurring with such a type of a graph could be used to provide a timely indication of changes that are occurring in market conditions. The subscribers and users of such a service would be able to detect a change from one market condition shifting toward another market condition and this shift, itself, could influence their buying or selling decisions.

Similarly, an activity report that compiles and informs the listing agent of activity appertaining to a property the listing agent has for sale by other agents, and which compares this level of activity to other properties that are also for sale, would provide novel and useful information to the listing agent as well as save time.

Furthermore, if this information were provided by the listing agent to his client, the seller, the listing agent would not have to personally answer a myriad of questions regarding these types of activity.

The ability of a buyer-client (i.e., a prospective buyer) to view select comparable properties that are posted to a listing by the listing agent is useful in persuading the prospective buyer that the asking price is reasonable.

The ability of a buyer-client to track preferred (i.e., favorite) properties and to timely receive updates, for example, that would show if the price has been lowered or if the property has gone into or fallen out of escrow would also be of great value.

The ability of an agent to view the favorite properties file of his buyer-clients would be useful in that it would allow the agent to compare the stated needs of his client with the apparent preferences demonstrated by the client. The agent would therefore be better able to serve his client, either by showing properties that are more akin to the favorite properties of his client, or by engaging in further dialogue with the client so as to better determine the client's true needs and desires.

The ability of the agent to view the most recent properties that a client has been viewing is similarly valuable.

An ability of the agent to search upcoming listings is useful because the agent can then elect to pass on specific upcoming listing information to his select clients in a most timely manner. The client, in turn, would feel especially well-served by this level of "personalized" service.

An ability for a listing agent to FAX to the system a disclosure of property defects and other documents that was available only to other agents makes this information readily available to other agents who would share it only with their selected prospective buyer clients. This would preserve the secrecy of this information from unwarranted parties, yet make it available to prospective buyers. Accordingly, a method to better comply with the law would be provided.

An ability to provide a "Client Commitment" form to both prospective buyers and sellers upon initial log-on is useful in establishing from the onset clear agent-client relationships as a prerequisite for the client in obtaining access to view select and valuable MLS information fields.

Accordingly, there exists today a need for a real estate information exchange process and system that has a data base accessible over the Internet (or an Intranet) to permit the exchange of such types of timely information between real estate agents and their clients that includes current MLS information and which also allows agents to exchange proprietary information amongst themselves that may then be selectively shared with certain of their clients.

Clearly, such a process and system would be especially useful and desirable.

2. Description of Prior Art

Real estate Internet based systems are, in general, known. These types of systems are limited in that they provide only an agent to client relationship. They burden the agent and do not permit agents to exchange proprietary information amongst themselves.

While the structural arrangements of the above described systems, at first appearance, may have similarities with the present invention, they differ in material respects. These differences, which will be described in more detail hereinafter, are essential for the effective use of the invention and which admit of the advantages that are not available with the prior processes or systems.

OBJECTS AND SUMMARY OF THE INVENTION

It is an object of the present invention to provide a real estate information exchange process and system that includes a data base accessible over the Internet or an Intranet that allows exchange of information between agent to agent and also between agent to client.

It is also an important object of the invention to provide a real estate information exchange process and system that can provide a graph of a predetermined geographical area, such as a city or county, of the percentage of listings that in escrow as compared with the total number of homes that are for sale.

Another object of the invention is to provide a real estate information exchange process and system that can provide an activity report that informs the listing agent of the amount as well as the source of activity regarding the names of other agents who have looked at the listing agent's property, as well as the names of those agents who have clients that have looked at the property, and to compare that level of activity with that of comparable homes that are for sale.

Still another object of the invention is to provide a real estate information exchange process and system that can allow a client to view selected comparable properties that are posted to a listing by the listing agent.

Still yet another object of the invention is to provide a real estate information exchange process and system that can allow a client to save and to track favorite properties and to receive timely updates regarding a change in status (i.e., price changes, going into or out of escrow) of those properties.

Yet another important object of the invention is to provide a real estate information exchange process and system that can allow an agent to view the favorite properties file of his clients.

Still yet another important object of the invention is to provide a real estate information exchange process and system that can allow an agent to view the most recent homes that have been accessed by his client.

Still yet another useful object of the invention is to provide a real estate information exchange process and system that can notify the agent by email or other means whenever his or her client(s) access the system.

One further important object of the invention is to provide a real estate information exchange process and system that can allow an agent to perform a search of upcoming listings while preventing the client from accessing this information (unless it is provided to the client by the agent).

One still further important object of the invention is to provide a real estate information exchange process and system that can allow a listing agent to FAX to the system a disclosure of property defects or other relevant documents that can be viewed directly only by other agents.

Still one more important object of the invention is to provide a real estate information exchange process and system that can provide a client-commitment form whereby a client, either a buyer or a seller, must first establish a relationship with a "registered" real estate agent (i.e., one who is authorized to access the system) prior to the client being provided with access to information that is compiled by the system.

One remaining object of the invention is to provide a real estate information exchange process and system that offers it features for use by agents on a subscription basis (i.e., for payment of a fee).

One remaining important object of the invention is to provide a real estate information exchange process and system that can provide agents with timely information regarding the availability of upcoming properties not yet on MLS.

One remaining especially important object of the invention is to provide a real estate information exchange process and system that can expedite the dissemination of MLS information amongst real estate agents and their clients.

Still yet one more important object of the invention is to provide a real estate information exchange process and system that requires the establishment of a client-agent relationship before access to select information fields is provided to the client.

Still one more additional important object of the invention is to provide a real estate information exchange process and system that can provide the agent or client with email or other alerts when a property meeting their saved criteria or a change in status of their tracked favorite properties occurs.

Briefly, a real estate information exchange process and system apparatus that is constructed in accordance with the principles of the present invention has an on-line data base accessible by subscription over the Internet (or an Intranet) that is periodically updated with current MLS listing information as well as with current information as to which real estate agents are authorized to use the system. After a client has logged on and satisfied the requirement of selecting an authorized agent, the client is provided access to selected information fields and services. The fields and services will vary depending upon whether the client is a buyer or a seller. After an authorized agent has logged on, the agent is provided with access to selected information fields and services as are deemed appropriate. After an authorized listing agent has logged on, the listing agent is provided with the most comprehensive access to system fields and services and can update or change selected information fields in the data base.

DETAILED DESCRIPTION OF THE INVENTION

Figure 1:
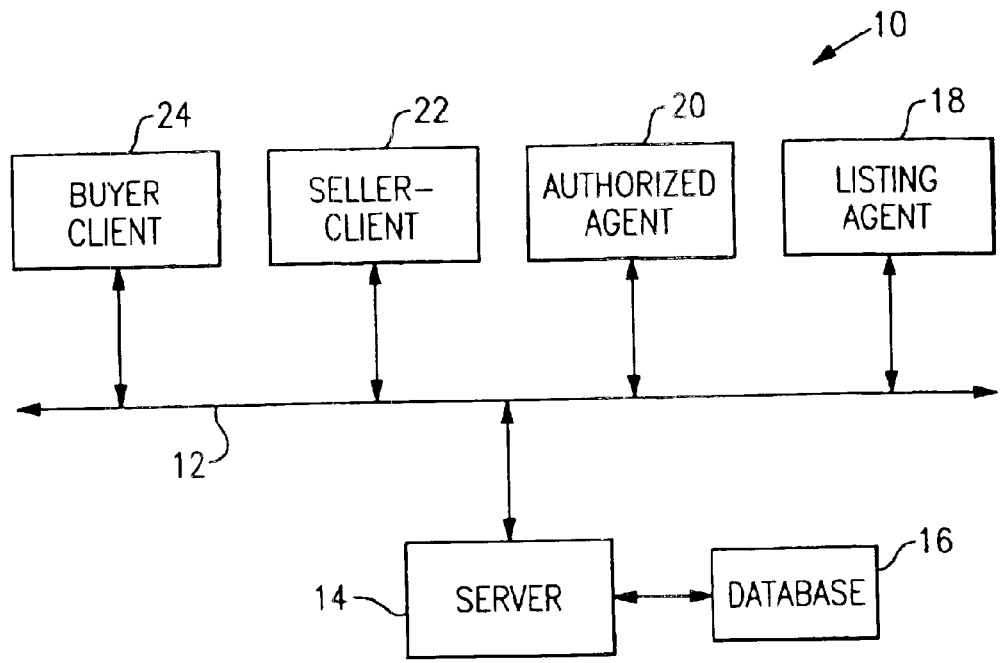
FIG. 1 is a block diagrammatic view of a real estate information exchange process and system for use over the Internet or an Intranet.

Referring on occasion to all of the drawings and in particular now to FIG. 1 is shown, a real estate information exchange process and system, identified in general by the reference numeral 10.

An area network 12 preferably includes the Internet. It may also include a Local Area Network, (LAN), sometimes also known as an "Intranet".

Only a small portion of the Internet network 12 is shown and is expandable, as desired.

A computer 14 is a "server" that is electronically connected to the Internet network 12 and can readily communicate with other computers and peripheral devices (not shown) that are also connected to the network 12, as are well known in the arts.

The computer (server) 14 includes access to a database 16 which it updates (maintains) as it receives new, relevant information that is transmitted over the network 12.

A number of users are shown connected to the network 12. A listing agent 18, an authorized agent 20, a prospective seller 22 type of a client and a prospective buyer type of a client 24 are shown engaged in two-way communications with the computer 14 over the network 12 and having, ultimately, access to certain of the information fields (i.e., files) that are stored in the database 16 or which are compiled by the system 10 during its operation.

Any number of these types of users 18–24 may similarly have access to the system 10.

Normally, the listing agent 18 and the authorized agent 20 will pay a subscription fee (on a monthly or other basis) in order to access the system and be listed on a "register" of authorized agents in the data base 16.

Clearly, the greater the number of agents that are willing to subscribe, the more profitable will be the system 10.

Other types of users, for example data entry, computer system analysts, and other types of software specialists (not shown) may also be "on-line" connected with the computer 14 and they may, as is well known in the computer arts, have specialized access capabilities as needed to enter data and to service the system 10 not specifically described herein.

Figure 2:
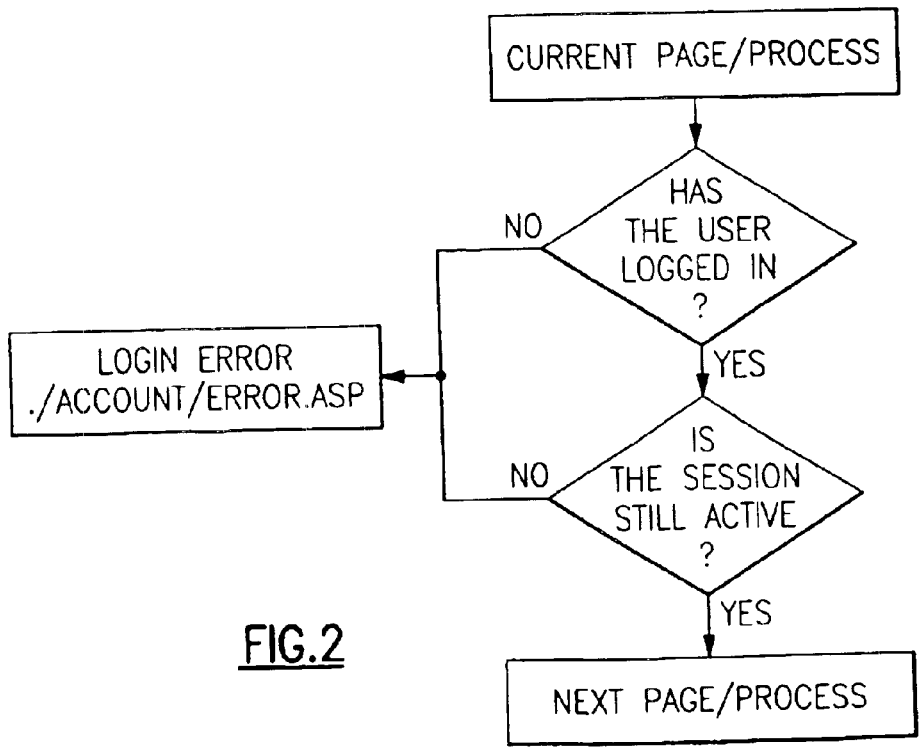
FIG. 2 is a flowchart of the overall application.

Referring in particular now to FIG. 2, an application flowchart 28 is shown that governs overall system operation for any given activity that is occurring.

Figure 3:
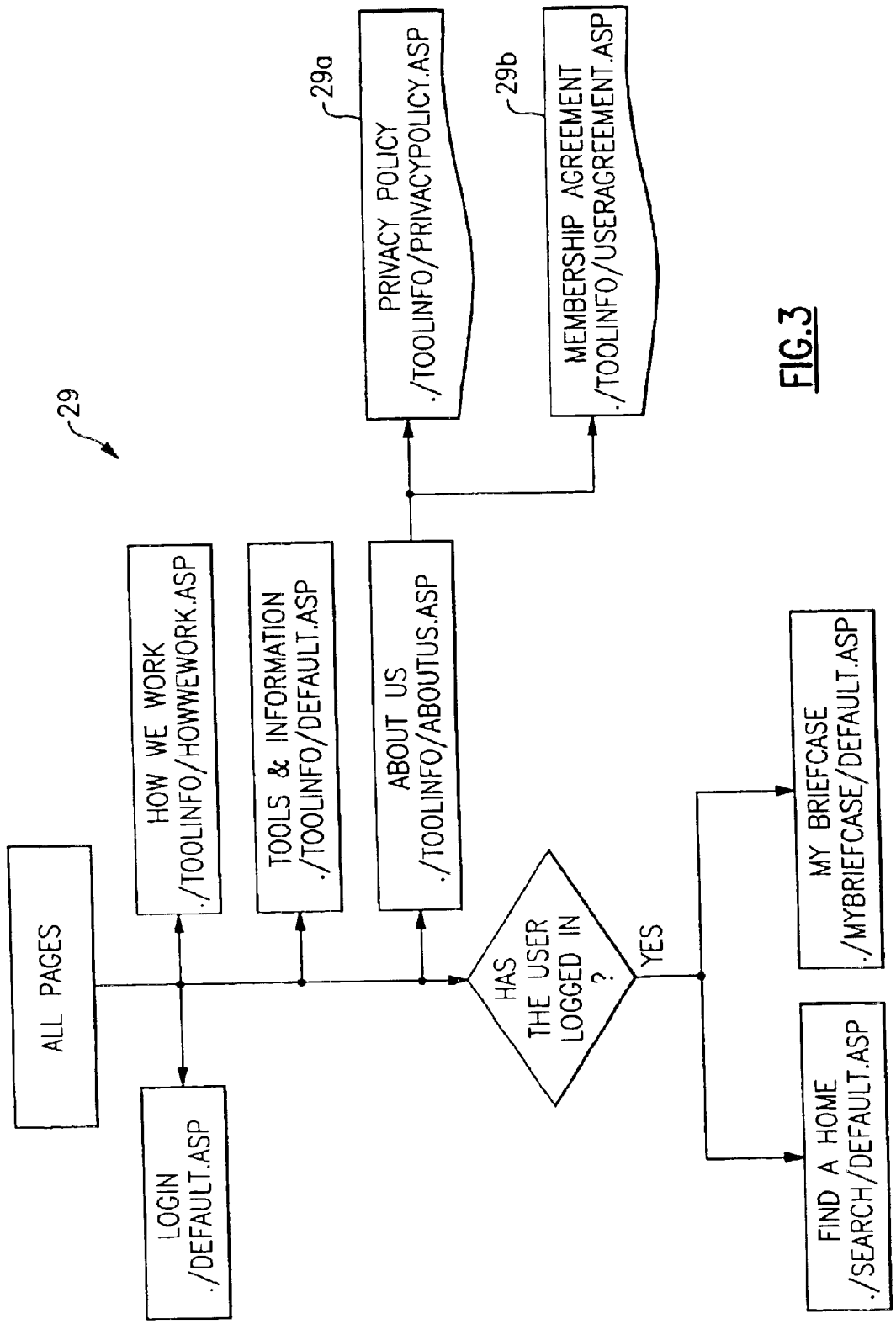
FIG. 3 is a flowchart of any page frame.

A page frame flowchart 29 is shown in FIG. 3 that provides greater detail of the system 10 features and operation.

In particular issues of privacy 29a and membership agreement 29 information are included in these subroutines.

Figure 4:
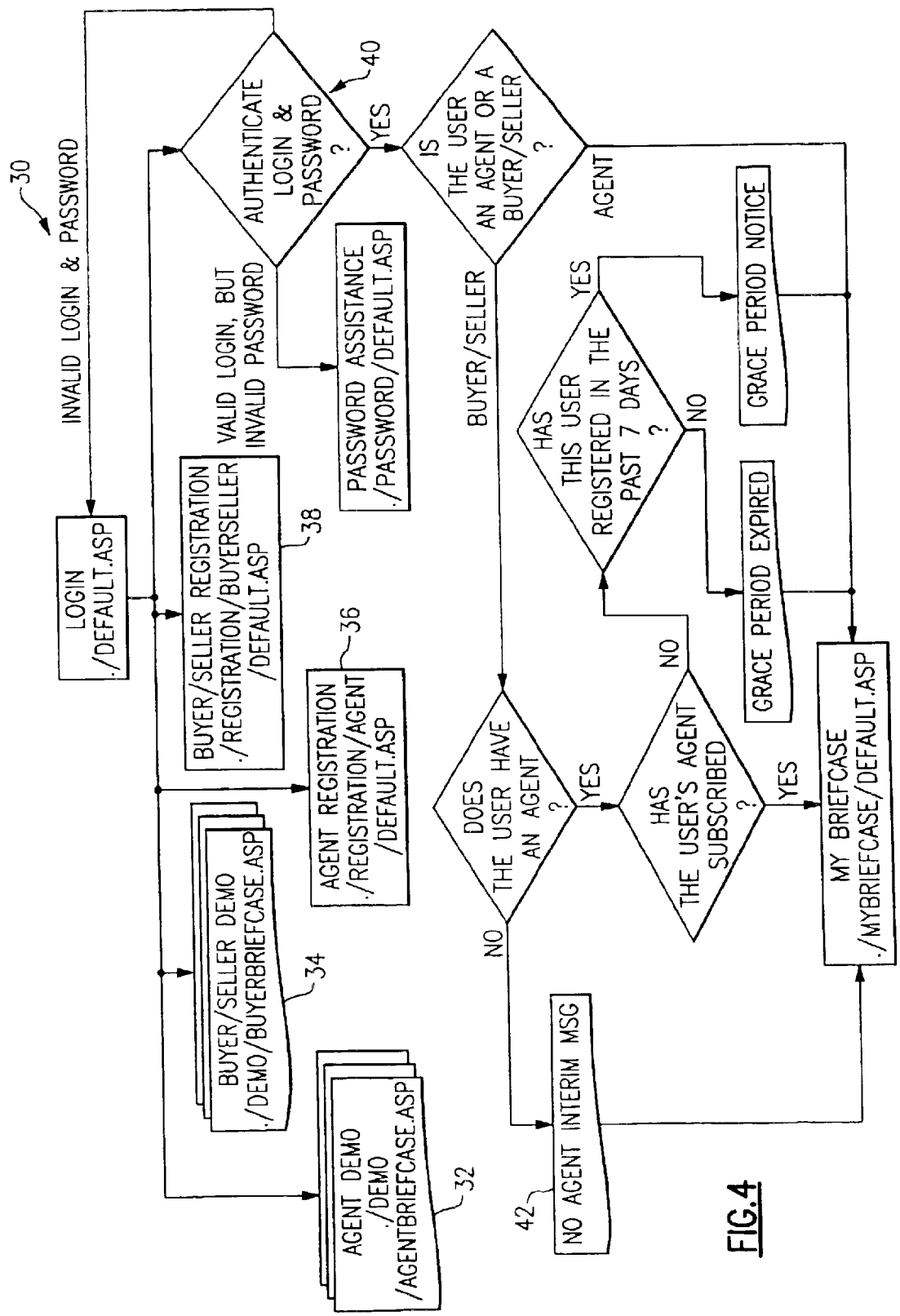
FIG. 4 is a flowchart of the home page and login procedure.

Referring in particular now to FIG. 4, a home page flowchart identified in general by the reference numeral 30 is shown, that details operation for the home page and for login.

It is noted that all of the various flowcharts are included for general information purposes sufficient to provide an enabling disclosure to one skilled in the computer programming and system arts, but are not necessarily discussed in detail unless it is to illustrate a particular feature of the system 10.

A review of the flowcharts will show one way in which the various features and capabilities of the system 10 are implemented. Obviously, other ways will become known to those having ordinary skill in the programming arts after having first benefited from the disclosure herein.

During login, the agent 20 may view an "agent demo" subroutine 32 as may the buyer 24 or the seller 22 view a "buyer/seller demo" subroutine 34.

Qualified agents may subscribe to the system 10 by electing and by properly completing the "screens" as provided by an agent registration subroutine 36. A "qualified" agent is described as a verified member of the MLS serving the local real estate market. The buyer 24 or the seller 22 may similarly gain access to the system 10 by electing and by properly completing the screens and agreements associated with a buyer/seller subroutine 38.

If the buyer 24, the seller 22, the agent 20, or the listing agent 18 have already logged onto the system 10 and merely wish to gain access, then the logic path would take them through a series of login subroutines, identified in general by the reference numeral 40.

The login subroutines 40 would authenticate the login procedure including verification of the password and, if required, of providing password assistance as well as in determining if the login is by an agent or a client (i.e., the buyer 24 or the seller 22). Different logic paths are, accordingly, provided.

If the user is either the buyer 24 or the seller 22 and does not have an agent (i.e., has not completed a commitment form on-line), the interim "no agent" message 42 is indicated and the buyer 24 or the seller 22 is guided through the registration process in which the buyer 24 or the seller 22 selects an agent and commits to work with that agent.

Figure 5B:
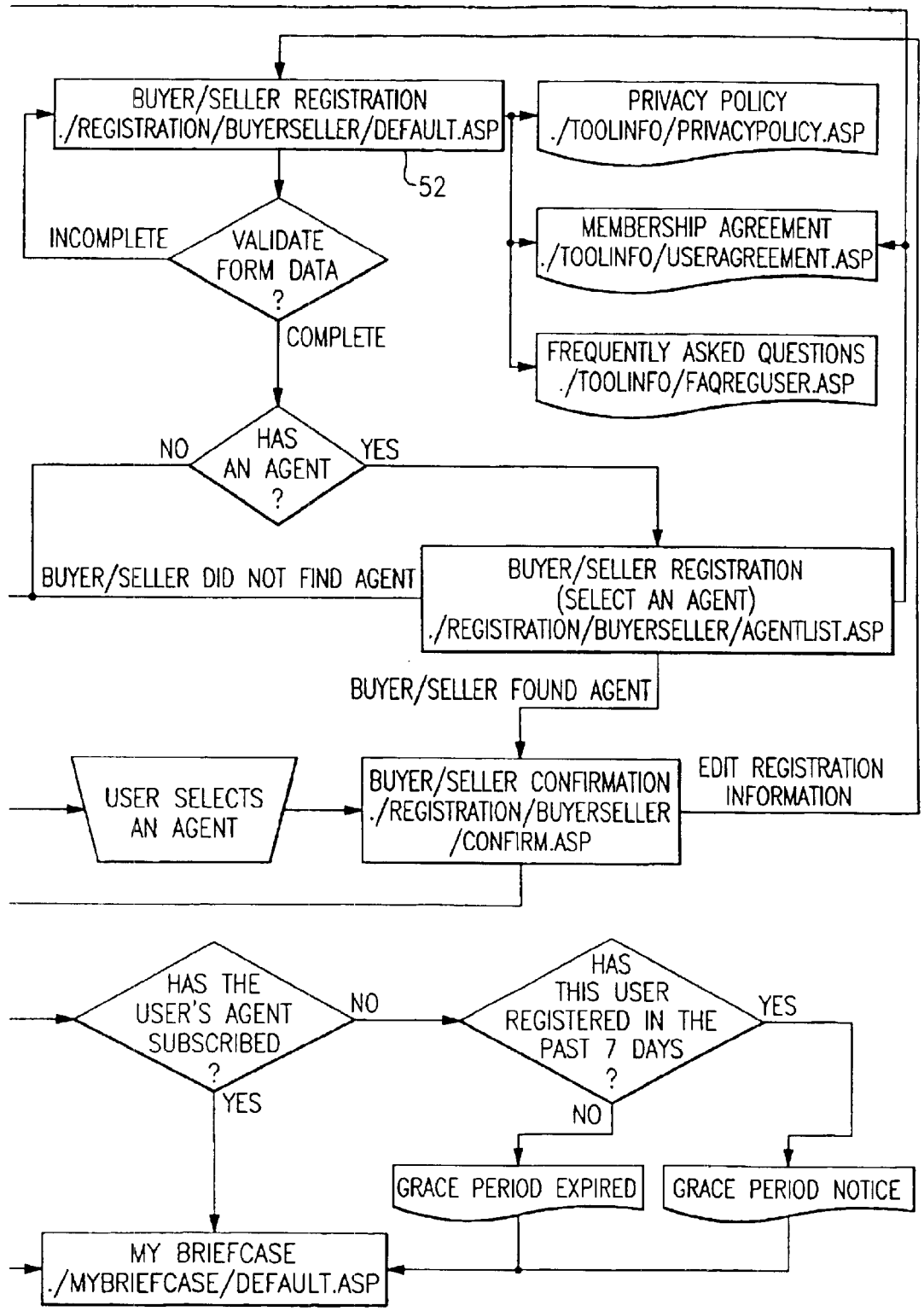
FIG. 5 is a flowchart of buyer or seller registration into the system.

This is detailed in a "buyer/seller registration" flowchart 50 as shown in FIG. 5. Issues of whether or not the agent 20, 18 is a subscriber (i.e., whether or not he or she is in fact authorized to use the system 10) are addressed in various subroutines. The buyer 24 and the seller 22 are, accordingly, guided through the agent selection and commitment process.

In particular, the buyer 24 or the seller 22 must commit to work with a particular agent by completing a registration form 52 on line in which they select an agent to work with. The selection of an agent can be delayed, however the buyer 24 or the seller will not be provided with access to all of the features of the system 10 that would otherwise be available to them had they selected an agent.

Although the buyer or seller typically know their agent in advance, the database 16 includes lists of all available agents from which the buyer 24 and the seller 22 may peruse and select an agent to work with. This is accomplished by completing the registration form 52. If the buyer 24 or the seller 22 selects an agent who has not subscribed to the system 10 and is therefore not authorized to use the system 10, the buyer 24 or seller 22 will be informed and options given. It is obviously desirable for the buyer 24 or the seller 22 that the agent enroll (i.e., subscribe) into the system 10.

Figure 6:
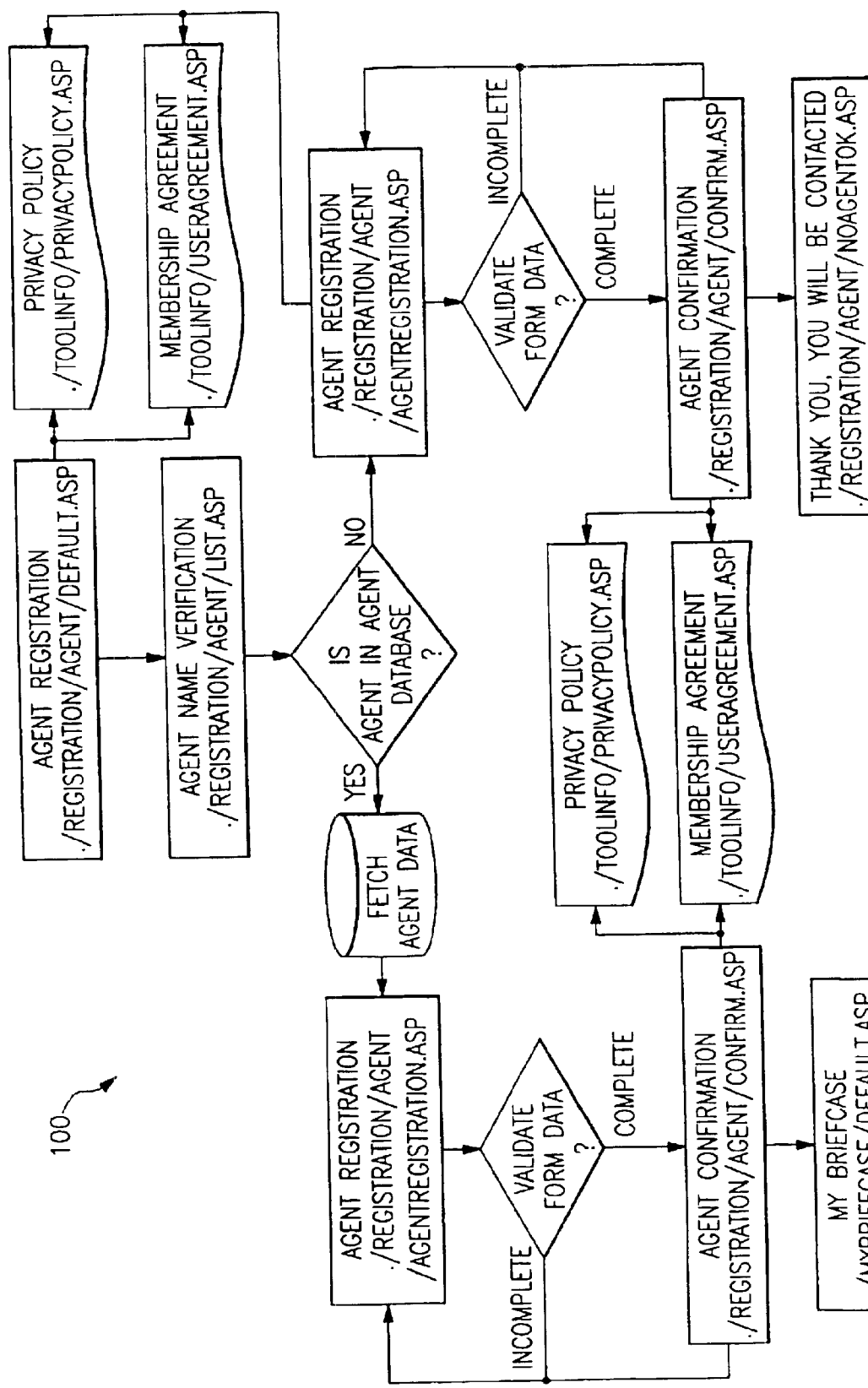
FIG. 6 is a flowchart of agent registration into the system.

Referring now to FIG. 6 an agent registration flowchart 100 is shown. If the agent is not in the database 16, he or she will be guided to complete an agent registration form 102 on line and will receive confirmation thereof. The privacy policy is stated to both the agent 20 and the client (22, 24) during registration so as to ensure a proper understanding and agreement of the conditions necessary for use of the system 10.

If the agent is properly registered, he or she will be given access to an agent briefcase series of features, as is described in greater detail hereinafter.

The flowcharts periodically include the letters "CO" and the name "CleanOffer". These refer to the name of a business entity that administers the instant system 10.

Figure 7:
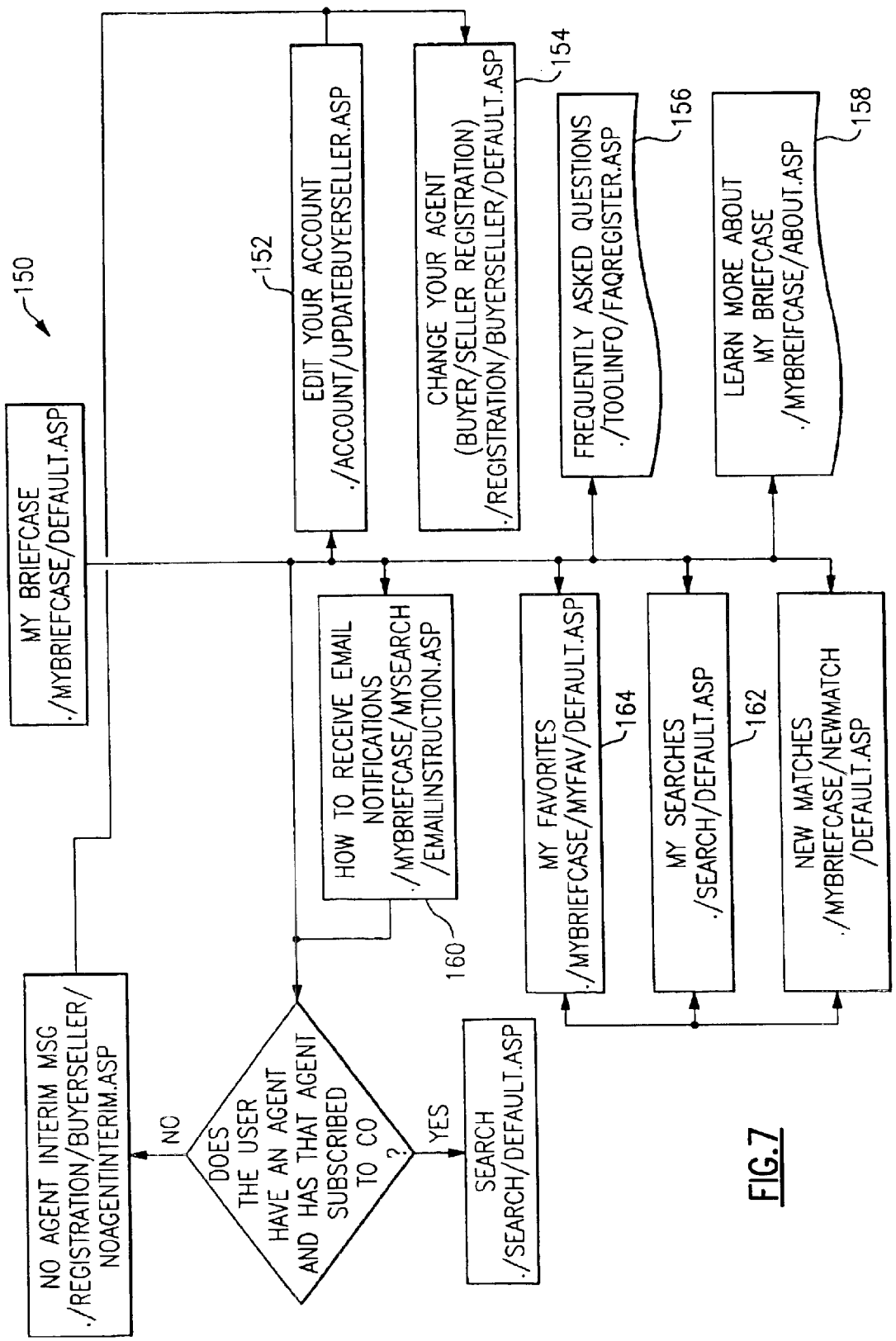
FIG. 7 is a flowchart of the features that are available to buyers and sellers.

Referring now to FIG. 7, a buyer/seller briefcase flowchart 150 is shown. The buyer or seller 22, 24 are able to update their account 152 including selecting a new agent 154, if they wish.

Frequently asked questions 156 are answered and they can learn more about the services that are available for their use in a "learn more" 158 subroutine.

The buyer 24 and seller 22 are guided to provide the necessary information so that they may receive e-mail updates 160. These e-mail updates 160 may include changes in the status of favorite types of properties as well as any other type of information that the agent 18, 20 desires to share with them.

Figure 8:
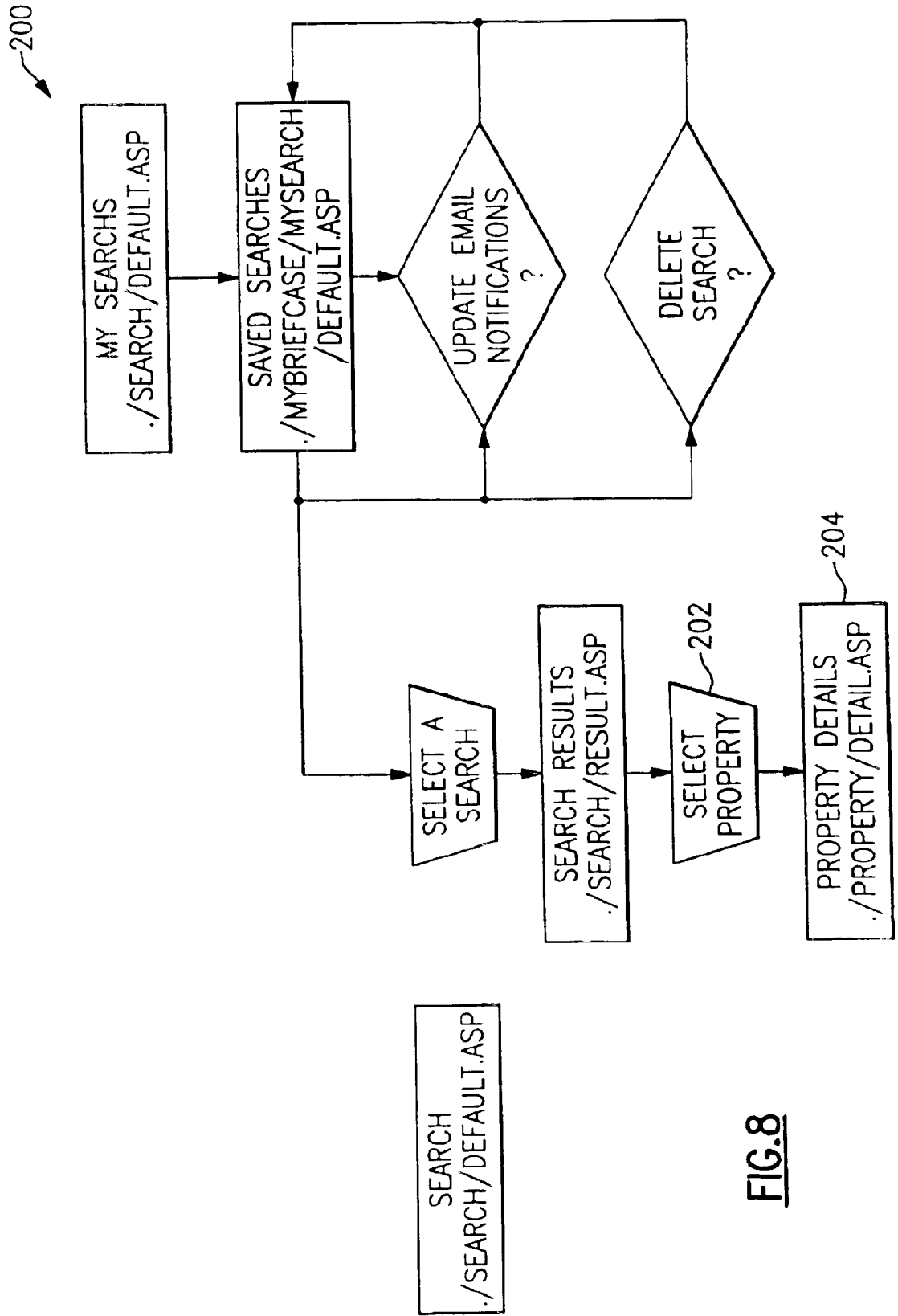
FIG. 8 is a flowchart of a search routine of the system.

A "my searches" subroutine 162 (see flowchart my searches 200 in FIG. 8) allows the buyer 24 or seller 22 to search various parameters. For example, the buyer 24 may search various property listings 202 looking for prospective homes to buy. He may find property details 204 and save these property listings 202 in another file, entitled "my favorites" 164.

The my favorites 164 subroutine and resultant file is updated by the buyer 24 to include those property listings 202 that he is most interested in. Accordingly, he can receive e-mail updates 160 as to changes occurring in the status of any of the favorite properties 164. This would apprise him (in a most timely manner) of a change in price, for example. He, being among the first to know of the change, may then elect to make a timely offer to purchase based on a new lower asking price, for example.

Figure 9:
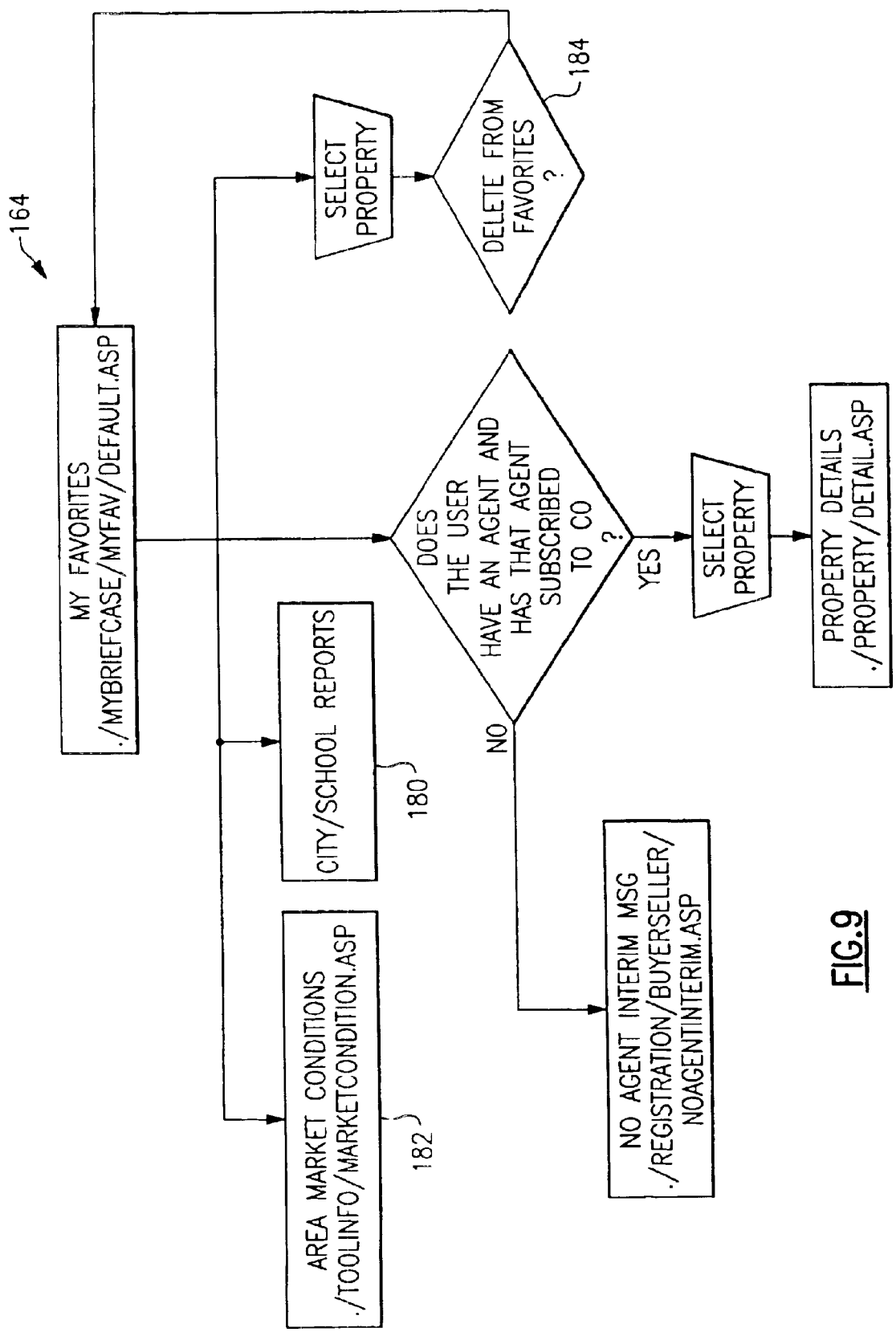
FIG. 9 is a flowchart of the favorite properties file of prospective buyers.

Referring now also to FIG. 9 for a detailed accounting of the my favorites subroutine 164. As is shown, the buyer 24 is able to also track incidental data as desired that appertains to the criteria for establishing his favorite properties. City and school reports 180 as well as area market conditions 182 (number of homes in escrow as compared to the number for sale) may also be viewed. There is no limit as to the amount of incidental information that the system 10 can include and associate with any given property.

The buyer 24 can elect to delete previous favorite properties 184 if they go into escrow (or if they actually close) or if, for whatever reason, his criteria change and he no longer is interested in tracking any of them.

Figure 10:
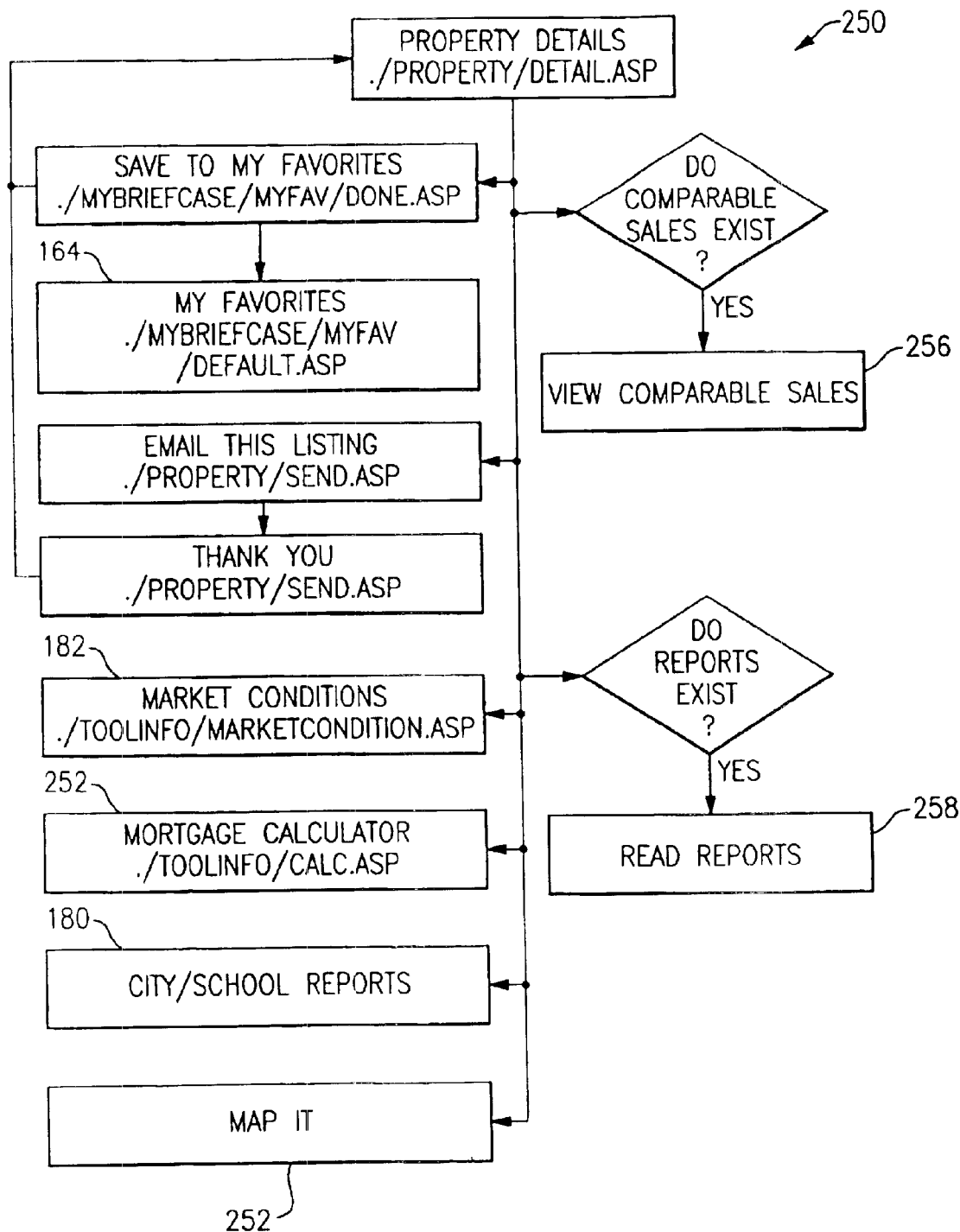
FIG. 10 is a flowchart of the details of a given property, including system features that are available.

Referring now to FIG. 10, a property details flowchart 250 is shown. After a successful search for a property based on a given set of criteria (see FIG. 11) the various property details are provided for scrutiny. Agent or client may also name and save any number of searches in order to easily search the same criteria again. They may also elect to receive email alerts should new listings become available that meet their search criteria.

A "map it" 252 feature is provided and allows the client to view the location of the property.

A mortgage calculator 254 allows the client to determine what a mortgage payment would be based on a given sales price, down payment, and interest rate. Various other closing costs are factored into the calculation, as desired.

The client (i.e., the buyer 24) or agent can see the property to view his favorites 164 as well as view if comparable properties 256 exist that have been sold. The comparable properties 256 file is provided only by the listing agent 18 specifically for the property for sale that is of concern (i.e., which has been listed by the listing agent 18).

Clearly, it is in the interest of the listing agent 18 to provide comparable properties 256 along with the listing agent's comments regarding these comparable properties 256 that have sold for a comparable amount, and preferably for an even greater amount, than the listed property, so as to help to convince the prospective buyer 24 that the property he is interested in is fairly priced. This feature will encourage the buyer 24 to submit an offer to purchase the listed property. Accordingly, agents 18, 20 will appreciate as a benefit of the system 10 its ability to provide comparable properties 256 data to the buyer 24 that can, in turn, help encourage the sale of the listed property to the buyer 24.

Also, if any report 258 that relates to any relevant area of the listed property are available, the buyer 24 can view them as well.

It is noted that listed properties include MLS properties. Accordingly, the MLS properties for sale data is entered into the database 16 through any number of ways, including the electronic transfer of MLS files, entry by data specialists, and by listing agents 18.

Figure 11:
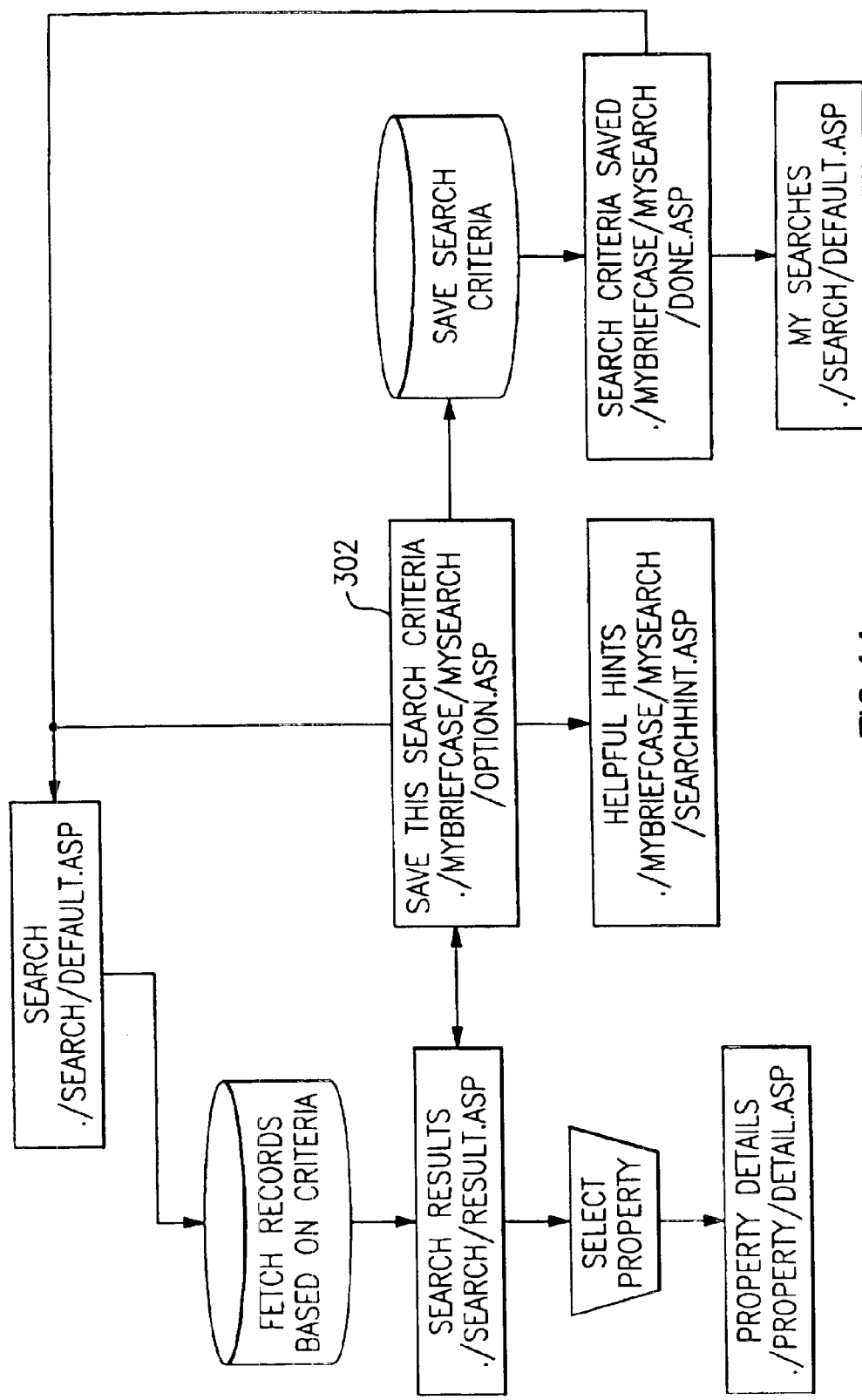
FIG. 11 is a flowchart of the search engine of the system.

Referring to FIG. 11, a search flowchart 300 is shown. The search flowchart 300 may be used by buyers 24, sellers 22, or agents 18, 20. The results obtained are based on the files in the database 16 and on a set of search criteria 302 that is entered.

The system 10 can be tailored to search for any criteria or set of parameters, as desired. For example, properties that cost less than a maximum threshold or properties that fall within a given price range may be searched for. Similarly, the search criteria may include the number of bedrooms, bathrooms, square footage, garage or laundry facilities, or any other parameter that is available in the database 16 and is desired.

The search criteria 302 are saved. Essential search criteria are not likely to change too frequently. Accordingly, it is advantageous to save the search criteria 302 to facilitate performing subsequent searches. The need for additional input may be lessened if the search criteria 302 are saved.

Figure 12:
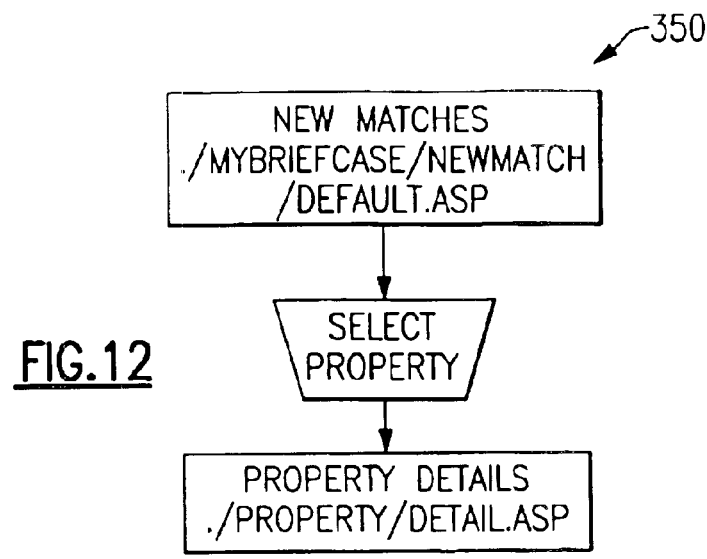
FIG. 12 is a flowchart of new matches obtained by the system.

Referring momentarily to FIG. 12, a new matches 350 flowchart is shown that correlates those properties that match with the search criteria 302.

Figure 13:
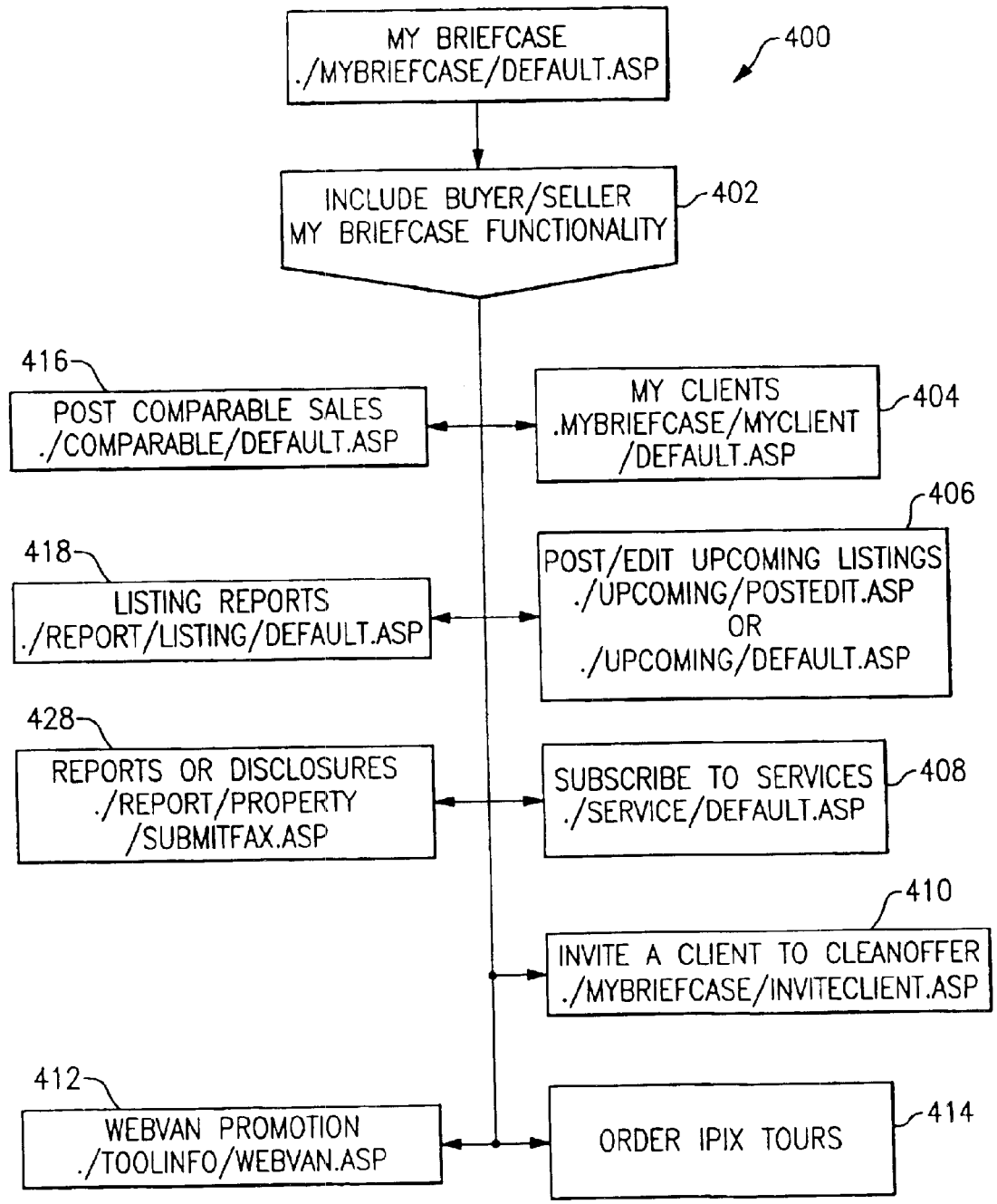
FIG. 13 is a flowchart of the features that are available to agents.

Referring now to FIG. 13, an agent briefcase flowchart 400 is shown. It is important to note that the agent briefcase 400 includes the functionality level 402 of the buyer/seller briefcase 150 (see FIG. 7). As such the agent 18, 20 may view the favorites files 164 of his clients (but he may not change them, unlike the client).

The agent 18, 20 may also view the searches 162 file of his clients to review the types of searches his clients have recently accomplished. The client (buyer or seller 24, 22) does not know that the agent 18, 20 is able to view these files 164, 162.

The agent 18, 20 is able to verify the types of properties that are really of interest to his clients by viewing the searches 162 and the favorite properties 164 files of his clients. If a discrepancy between the stated wishes of the client and the properties the client appears to have an interest in is detected, the agent 18, 20 can respond accordingly.

The agent 18, 20 may respond by showing the client properties that are similar to those in the client's favorite properties file 164 or by discussing the matter further with his client. Accordingly, the agent 18, 20 is provided with an optimum method of showing to his buyer-clients 24 the types of properties that they are really interested in purchasing. This maximizes the chances that a sale will occur as a result which, in turn, makes the system 10 especially valuable to the agent 18, 20.

The agent 18, 20 is able to do considerably more while having access to the system 10. The agent 18, 20 can view a file of his clients 404 (see FIG. 17 to gain an overview or to select a particular client for further inquiry), can post or make edits to upcoming MLS listing 406 (see FIG. 16), can subscribe (or renew his subscription) to services 408, and he can invite a client 410 of his to log into (i.e., to join) the system 10.

The agent 18, 20 can also make avail of specialized services that were heretofore time consuming and difficult to arrange. For example, the agent 18, 20 can readily contact an alternate service provider, for example Webvan 412 for promotional services. Webvan 412 can cater an open house, for example or the agent 18, 20 can even subscribe to virtual reality types of property tours 414, such as are offered by IPIX tours.

The listing agent 18 alone can post comparable properties 416 that have sold which the listing agent 18 wishes to accompany (i.e., attach to) a property that he has listed with the system 10. The prospective buyers 24 of other agents 20 may then view the comparable properties 416.

As was mentioned hereinabove, the comparable properties file 416 (see reference numeral 256, FIG. 10) can be viewed by clients as well as by agents 20. This is because agents 18, 20, in general, even those agents 20 that have not listed the property, are able to enjoy the buyer/seller functionality 402 level of the system 10.

Figure 14:
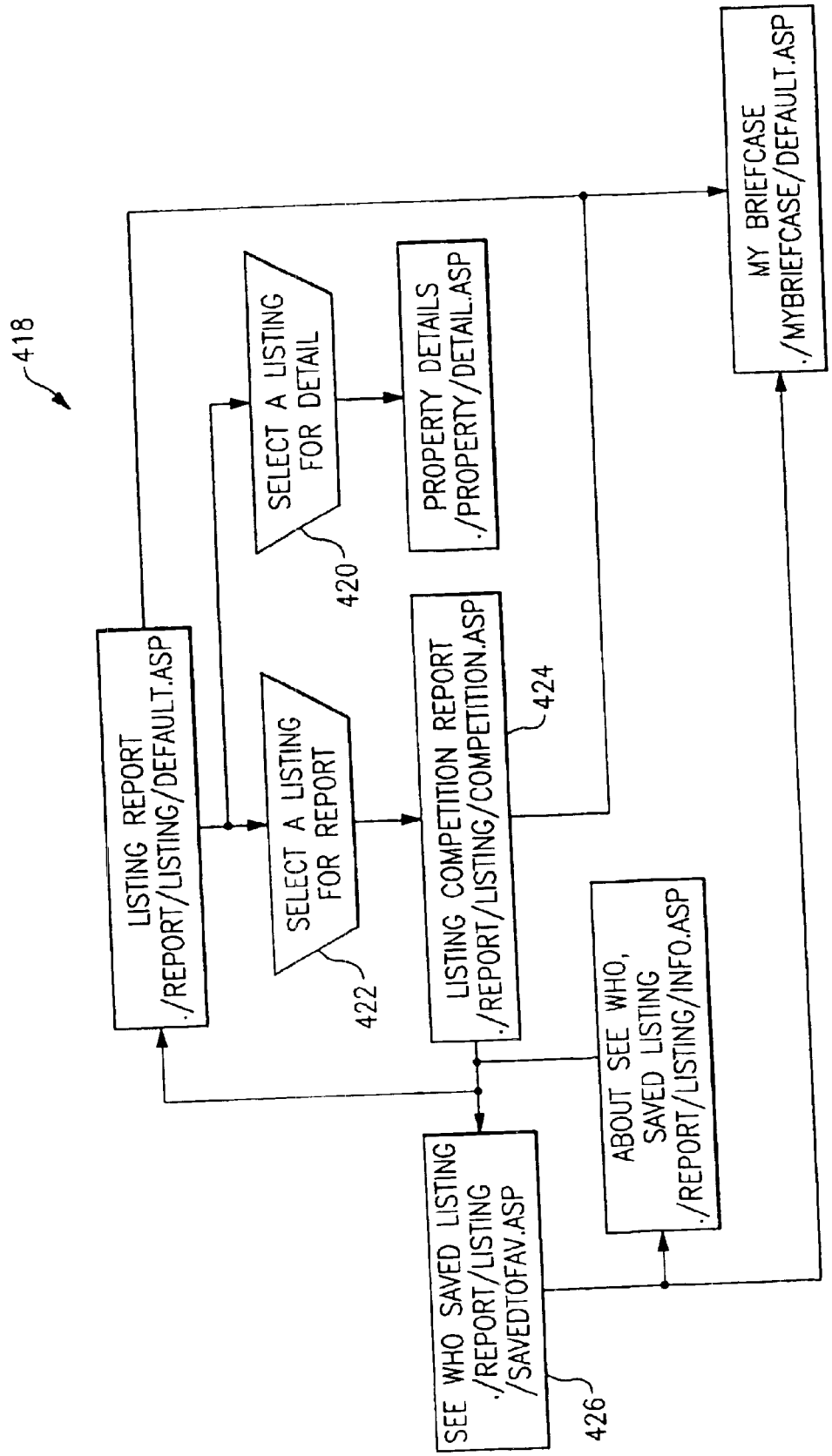
FIG. 14 is a flowchart of the listing reports that are available to agents.

Listing agents 18 may also access a listing reports subroutine 418 (see also FIG. 14) in which they can select a listing for details 420, select a listing for reports 422, select a listing competition report 424 that shows comparable properties and see who (i.e., what other agents 20 and their clients) have viewed and saved the properties 426 that the listing agent 18 has posted with the system 10.

This is valuable in determining the relative activity appertaining to any given listed MLS property that the listing agent 18 has posted. Furthermore, the listing agent 18 may wish to share (i.e., to e-mail) this information to his seller-client 22 (i.e., the person that has listed the property with the listing agent 18).

The seller 22 will feel well served by receipt of activity that is sent to him by the listing agent 18. Furthermore, the listing agent 18 is freed of having to determine, or worse yet guess, at the level of activity and try to answer the questions of the seller 22 in this regard. An objective compilation of activity regarding any listed property is provided by the system 10.

Figure 15:
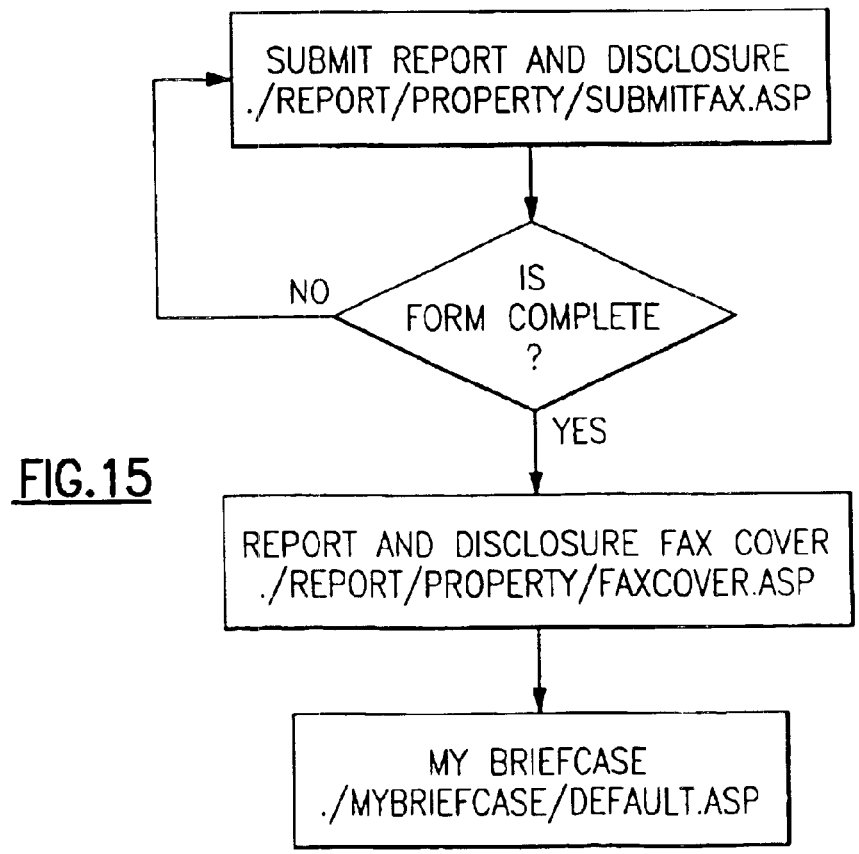
FIG. 15 is a flowchart of the procedure for submitting by facsimile reports and disclosures (of defects) that appertain to a property.

Both the listing agent 18 and the non-listing agent 20 are able to view the file of reports or disclosures 428 that relate to any given property. Refer also to FIG. 15 for details as to how the listing agent 18 only may submit the report by facsimile to the system 10.

The disclosures 428 file will include a listing of any property defects and the like. Obviously, the seller 22 will not want clients (i.e., other buyers 24 or other sellers [not shown]) to view this information. The law requires that such a disclosure be made to the prospective buyer 24. The seller 22 will normally rely upon the discretion of the agents 18, 20 to access this information and to only share it with appropriate prospective buyers 24.

The listing agent 18 need only supply this information to the system 10 once. Other agents 20 are then able to access it and to disseminate it as required. This lessens the burden of the listing agent 18, which in turn further encourages agents 18, 20 to list properties with and to otherwise utilize the system 10.

Figure 16:
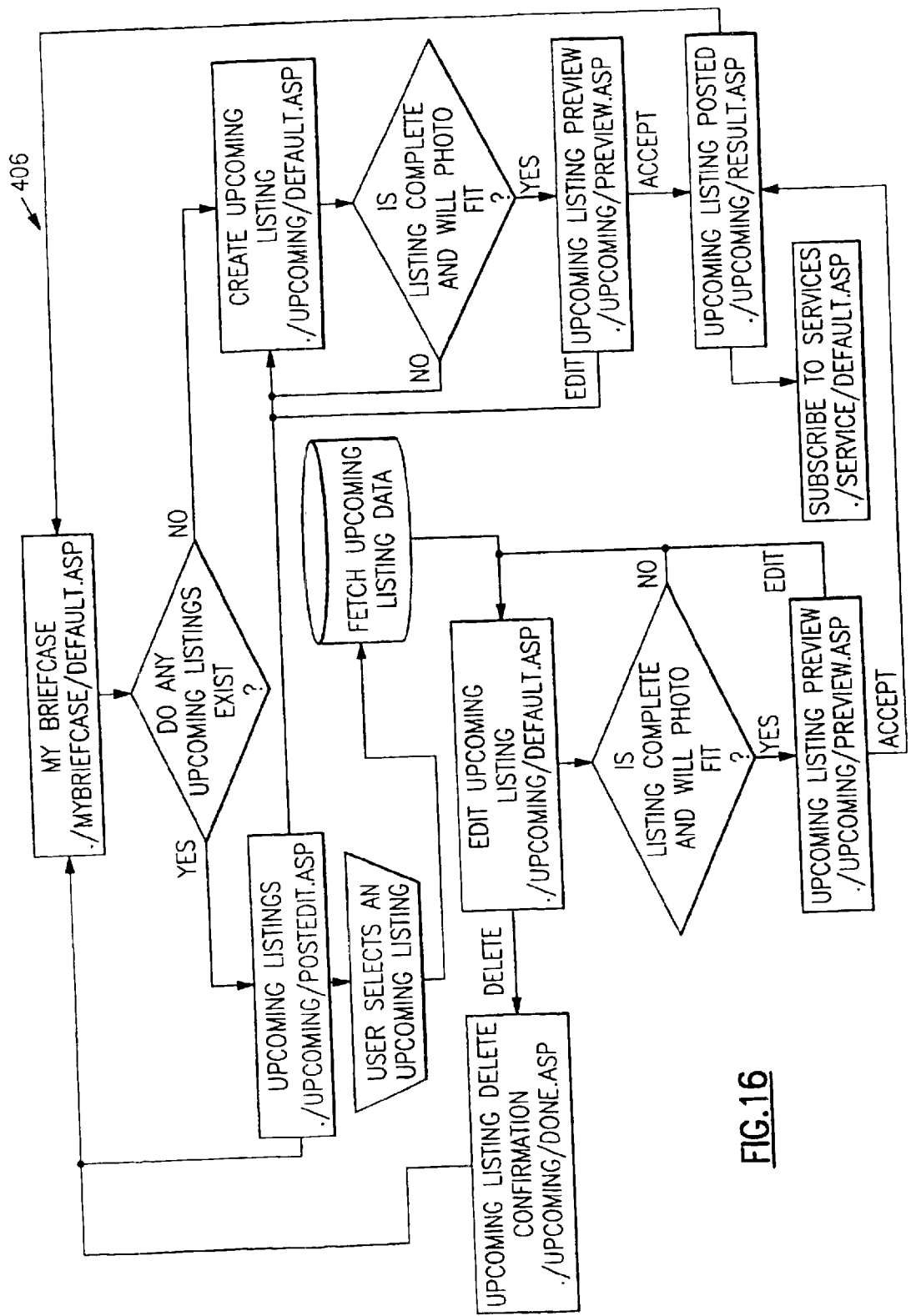
FIG. 16 is a flowchart of how an agent can post upcoming MLS listings to the system database.

Referring now to FIG. 16, the detailed flowchart as to how listing agents 18 can post to the system 10 upcoming MLS property listings in a timely manner or make edits to existing postings of upcoming properties.

This information is not generally made available to buyers 24 or sellers 22 but it is available to both listing agents 18 as well as non-listing agents 20. The agents 18, 20 can search for properties, including upcoming properties, that match the needs of their prospective buyer clients 24 and the agents 18, 20 may, themselves, share this information with their selected clients 24, in particular those clients 24 who desire to purchase the types of property that are soon going to be listed with the MLS.

It is important to note that the sellers of these upcoming properties have agreed to use the MLS in order to maximize the chances for selling their properties. For various reasons, a seller or agent may not yet be ready to put a property in the MLS (i.e., the house is not ready, etc.).

Figure 17:
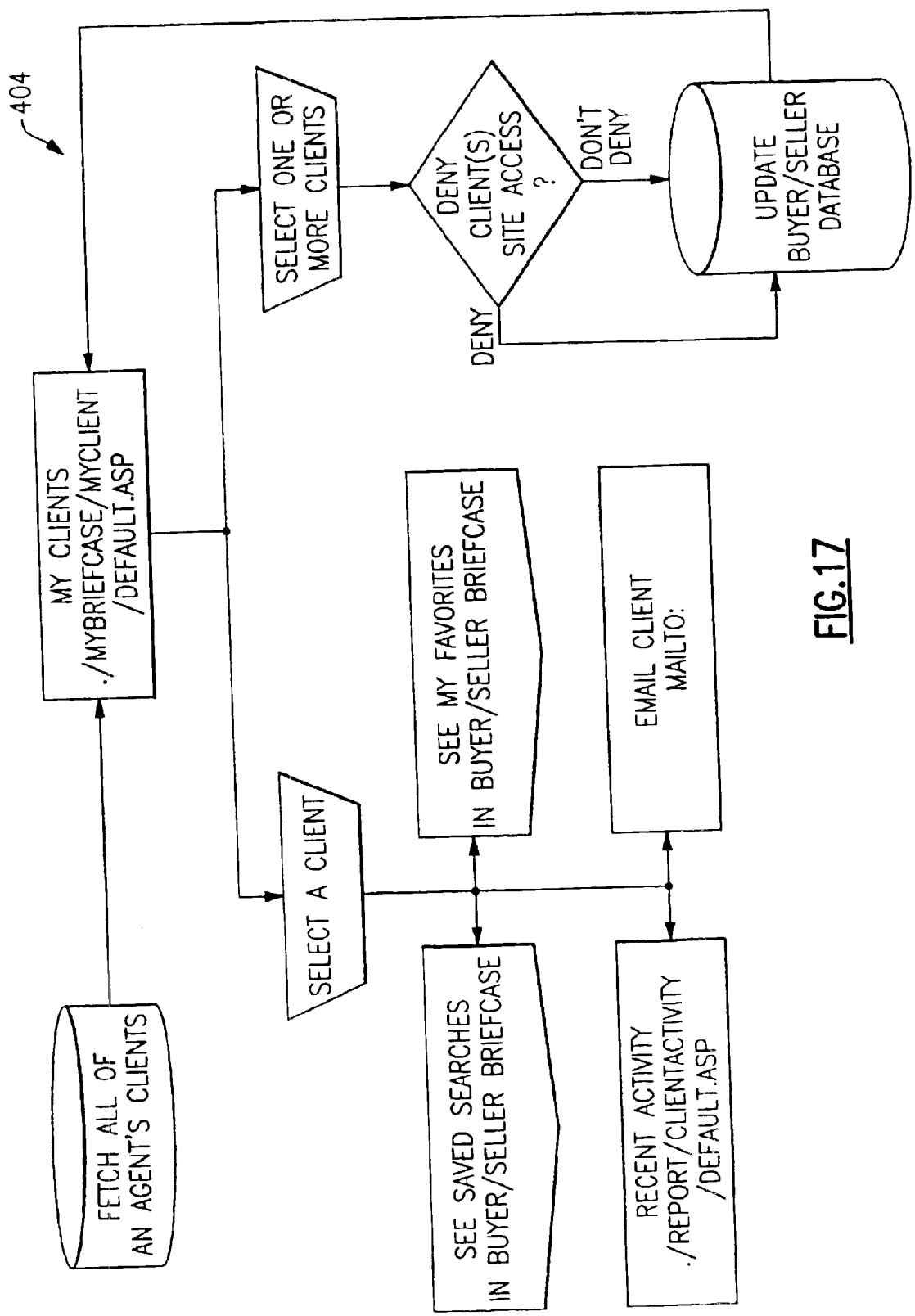
FIG. 17 is a flowchart of the client features provided to agents by the system.

Referring now to FIG. 17, the agent 18, 20 may fetch from the database 16 files of all of his clients (that have logged onto the system 10).

The agent 18, 20 may use these subroutines to duplicate the functionality of the buyer/seller briefcase 150 in that the agent 18, 20 may view the saved searches of a particular client, view any recent activity by the client, view the favorites files of the client, or send e-mail to the client, for example, a property defects report to the prospective buyer 24.

The agent 18, 20 may also deny access to the system 10 (i.e., to the site) to certain clients at his discretion, for example, if they are no longer the client of the agent 18, 20. The client 22, 24 would then have to establish a relationship with another authorized agent in order to continue having access to the features of the system 10.

When the term "agent" is used, it is to be understood that this term refers to any type of a real estate agent including real estate brokers.

Operation:

In use, all data, including property descriptions and related information is entered into the database 16 by agents 18, 20 and, as was mentioned hereinabove, by other data entry and computer specialists (not shown). Agent 18, 20 information and client 22, 24 information is automatically captured as they log into the system 10.

To gain access, agents 18, 20 must furnish all necessary information and pay for a term of subscription to the services provided. The agents 18, 20 must agree to the terms and conditions of use as are indicated on various "screens" that are presented to them on their own computer. They "click" on certain icons to signal their agreement in order to complete the initial log on procedure. They also select a password that matches with their name and is needed in order for them to later log on and to gain access to the system 10 providing, of course, that their subscription is still current or that they are still within a grace period.

During normal login, agents 18, 20 need only enter their name and password in order to gain access to all of the system 10 features and services. Once they have subscribed, the names of agents 18, 20 will appear on the data base 16 for clients 22, 24 to choose amongst as the clients 22, 24 select an agent with whom to establish a working relationship.

Both buyers 24 and sellers 22, in order to gain access to the system 10, must furnish all necessary information and select an authorized agent (i.e., one who is current in their membership subscription status) with whom they will work. The buyer 24 or seller 22 must first commit to work with that agent whom they have selected (identified by either reference numeral 18 or 20) by clicking on certain icons on a "commitment screen".

The commitment, while not necessarily legally binding, nevertheless establishes a working relationship between the client 22, 24 and the agent 18, 20. The agent 18, 20 is, of course, notified by the system 10 whenever a new client 22, 24 elects and establishes a relationship with him or her.

Buyers 24 and sellers 22 must also agree to the terms and conditions of use that are also presented to them. They "click" on certain icons to signal their agreement and complete their initial log on. They also will select a password that must match their name in order for them to later log on and gain access to the system 10.

After having selected an agent 18, 20 to work with and after having completed their initial log in, both buyers 24 or sellers 22 need only enter their name and password in order to log on thereafter.

Of course, for both agents 18, 20 as well as for buyers 24 and sellers 22 in order to log onto the system 10 over the Internet 12, it is necessary for them first to enter an address (i.e., "URL") that will allow them to access the server 14 of the system 10, as is well known in the Internet and computer-related arts.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A real estate information exchange process and system, comprising:
   (a) a database that is accessible by connection to an area network;
   (b) means for sharing MLS property information between a first real estate agent and a client; and
   (c) means for sharing MLS property information between said first real estate agent and a second real estate agent; and
   wherein said client is provided access to said system subsequent to said client electing to work with said first real estate agent and wherein said client must first agree to have said first real estate agent represent said client by accepting a Client-Commitment that is provided over said area network to said client and wherein said client must fully complete and agree to said Client-Commitment prior to an enabling of said means for sharing MLS property information between said first real estate agent and said client.

2. A real estate information exchange process and system, comprising:
   (a) a database that is accessible by connection to an Internet network;

(b) means for sharing MLS property information between a first real estate agent and a client; and (c) means for sharing MLS property information between said first real estate agent and a second real estate agent; and wherein said client is provided access to said system subsequent to said client electing to work with said first real estate agent and wherein said client must first agree to have said first real estate agent represent said client by accepting an online Client-Commitment that is provided over said Internet to said client and wherein said client must fully complete and agree to said Client-Commitment prior to an enabling of said means for sharing MLS property information between said first real estate agent and said client.

3. The real estate information exchange process and system of claim 2 including means for periodically updating said database with current MLS information.

4. The real estate information exchange process and system of claim 2 wherein said real estate agent is provided access to said system subsequent to the payment of a fee.

5. The real estate information exchange process and system of claim 2 wherein said first real estate agent includes one of a plurality of real estate agents, each of whom are included in said database as a current subscriber.

6. The real estate information exchange process and system of claim 2 wherein said system is adapted to maintain a file of favorite properties that are selected by said client.

7. The real estate information exchange process and system of claim 6 wherein said system provides updates to said client regarding a change in status of any of said favorite properties.

8. The real estate information exchange process and system of claim 2 wherein said client includes a prospective seller of a real estate property.

9. The real estate information exchange process and system of claim 2 wherein said client includes a prospective buyer of a real estate property.

10. The real estate information exchange process and system of claim 2 wherein said first agent includes a plurality of first agents.

11. The real estate information exchange process and system of claim 2 wherein said first agent includes a listing agent of a real estate property.

12. The real estate information exchange process and system of claim 2 wherein said system is adapted to provide to said client a graph of a percentage of real estate properties that are currently in escrow as compared with a total number of real estate properties that are offered for sale in a predetermined geographical area.

13. The real estate information exchange process and system of claim 2 wherein said system is adapted to provide to said client a listing of comparable properties selected by the listing agent that have sold with a property that is offered for sale.

14. The real estate information exchange process and system of claim 2 wherein said system is adapted to provide to said first agent access to any of the features that are available to said client.

15. The real estate information exchange process and system of claim 2 wherein said first agent is a listing agent for a real estate property that is offered for sale and wherein said first agent is adapted to post to said system a list of comparable properties with respect to said real estate property.

16. The real estate information exchange process and system of claim 2 wherein said first agent is able to view a favorite properties file of said client.

17. The real estate information exchange process and system of claim 2 wherein said first agent is able to view a listing of the most recent properties that are for sale that have been viewed by said client.

18. The real estate information exchange process and system of claim 2 wherein said first agent is able FAX to said system a disclosure of property defects, and wherein said disclosure of property defects is available for viewing by said second real estate agent.

19. The real estate information exchange process and system of claim 2, wherein a client commitment form is made available to said client upon an initial login that is required for both buyers and sellers to complete in order for said client to gain access to said system.

20. The real estate information exchange process and system of claim 2, wherein an agent is able to view a saved property search criteria of said client.

21. The real estate information exchange process and system of claim 2, including means for alerting an agent when said client registers on said system.

22. The real estate information exchange process and system of claim 21, wherein said means for alerting includes transmittal of an email to said agent.

23. The real estate information exchange process and system of claim 2, including means for alerting an agent when said client selects said agent to represent said client.

24. The real estate information exchange process and system of claim 23, wherein said means for alerting includes transmittal of an email to said agent.

25. The real estate information exchange process and system of claim 2 wherein said system serves as a clearinghouse for a listing agent to input information regarding an upcoming listing prior to said listing being placed in said MLS service and for at least one other agent to retrieve said information prior to said listing being placed in said MLS service.

26. The real estate information exchange process and system of claim 2 including means for alerting said agent providing said client is a client of said agent subsequent to said client accessing said system.

27. The real estate information exchange process and system of claim 26 wherein said means for alerting said agent includes transmitting an email to said agent.

28. The real estate information exchange process and system of claim 2 including a listing agent and wherein said system is adapted to provide to said listing agent a report showing how many times the listing was viewed on-line by another user of said system and how many times the listing was saved to a "favorites file" of said another user.

29. The real estate information exchange process and system of claim 28 wherein said listing agent is provided with the identity of an agent representing said another user.

30. The real estate information exchange process and system of claim 29 wherein said listing agent is provided with information if the agent viewed and saved the listing in said "favorite file".

31. The real estate information exchange process and system of claim 30 wherein said listing agent is provided with information if said another user viewed and saved the listing in said "favorite file".

32. The real estate information exchange process and system of claim 2 wherein said first agent includes a listing agent and wherein said system is adapted to provide to said listing agent a comparison of activity regarding a listing that is posted to said system by said listing agent as compared with the activity of other listings in a predetermined area and price range that are comparable with said listing.

* * * * *